June 26, 1951     A. EISELE     2,558,291
INTERNAL BORE GAUGE CHECKING DEVICE
Filed Nov. 23, 1948
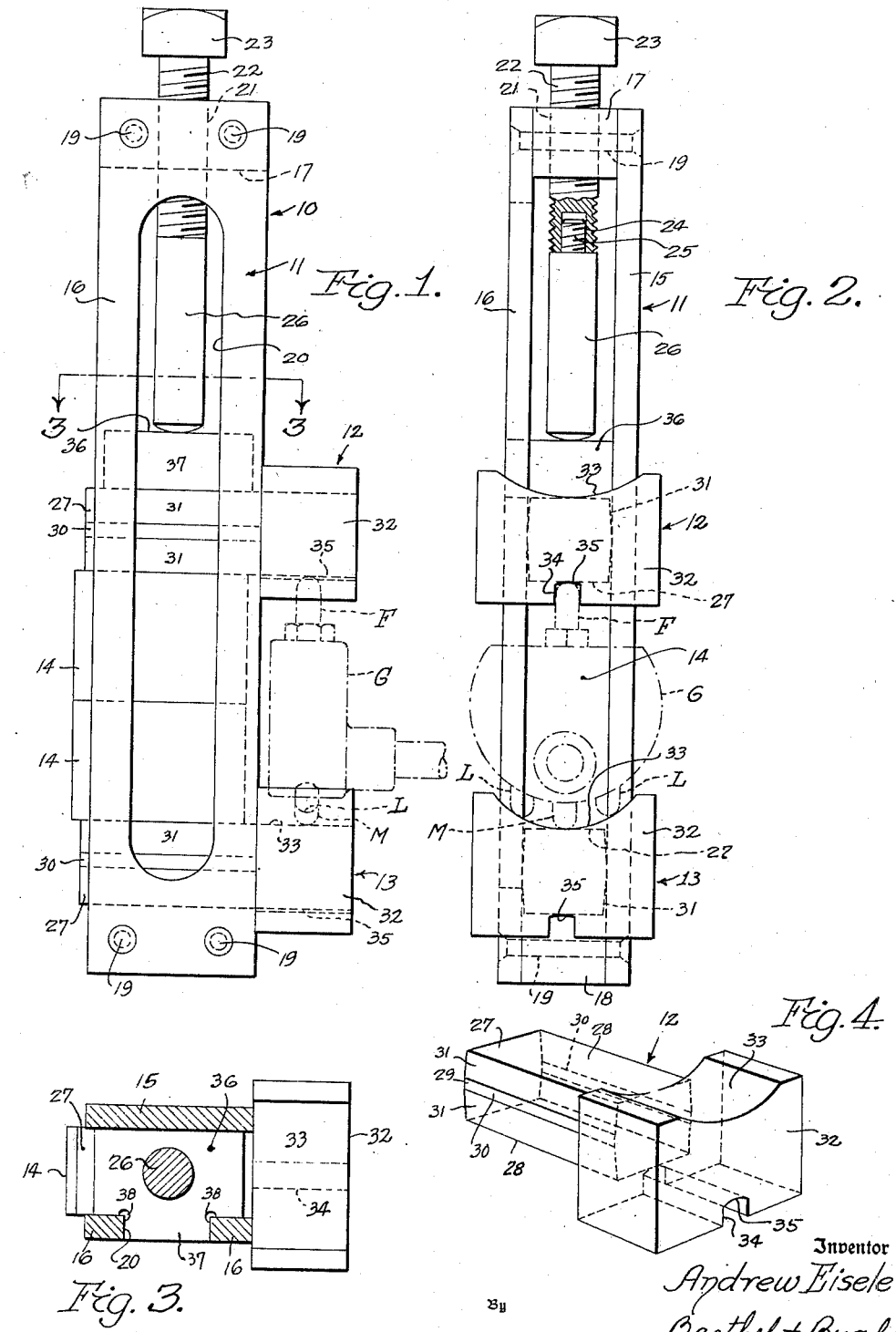
Inventor
Andrew Eisele
By Barthel & Bugbee
Attorneys Patented June 26, 1951

2,558,291

UNITED STATES PATENT OFFICE 2,558,291

INTERNAL BORE GAUGE CHECKING DEVICE

Andrew Eisele, Detroit, Mich.

Application November 23, 1948, Serial No. 61,700

2 Claims. (Cl. 33—143)

This invention relates to gauges and, in particular, to gauge block holders.

One object of this invention is to provide an internal bore gauge checking device which consists of a holder for precision gauge blocks and adapted to clamp two or more such blocks adding up to the diameter to be checked by the internal bore gauge.

Another object is to provide an internal bore gauge checking device of the foregoing character wherein the gauge blocks are clamped between jaws, one of which has a concave extension surface aligned with the outside surface of one of the outermost gauge blocks, the other jaw having an extension surface aligned with the outside surface of the other outermost gauge block so that an internal bore gauge inserted between the two extension surfaces will be applied to a diameter which is the same as the distance between the said outside surfaces.

Another object is to provide an internal bore gauge checking device of the foregoing character wherein one of the jaws has a notch or groove therein for receiving the fixed measuring pin of the internal bore gauge, the movable measuring pin and the locating pins engaging the concave extension surface on the other jaw.

Another object is to provide an internal bore gauge checking device of the foregoing character wherein the jaws are provided with extension surfaces of different radii to be used for checking internal bore gauges on different diameters, the jaws being insertable interchangeably in the holder or frame of the instrument.

In the drawings:

Figure 1 is a side elevation of an internal bore gauge checking device according to a preferred form of the invention;

Figure 2 is a front elevation, partly in section, of the checking device shown in Figure 1;

Figure 3 is a cross-section through the checking device of Figures 1 and 2, taken along the line 3—3 therein; and Figure 4 is a perspective view of one of the gauge block clamping jaws.

Referring to the drawings in detail, Figure 1 shows an internal bore gauge checking device, generally designated 10, as consisting generally of a frame 11 slotted to receive a pair of jaws 12 and 13 between which precision gauge blocks 14 are adapted to be clamped. The frame 11 consists of a pair of parallel side bars 15 and 16 separated from one another by spacing blocks 17 and 18 at their opposite ends secured together in assembly by fasteners 19. The bars 15 and 16 form guide rails for the jaws 12 and 13 and the bar 16 is slotted as at 20 to permit added visibility of the blocks 14 and jaws 12 and 13.

The spacing block 17 is bored and threaded as at 21 to receive the shank 22 of a clamping screw 23. The latter is in two parts, having its forward end bored and threaded as at 24 to receive the threaded shank 25 on the reduced diameter end portion of a contact pin or stem 26 (Figure 2). The stem or pins 26 serve as extension rods and are supplied in different lengths so as to permit the jaws 12 and 13 to be separated by widely varying distances without having an excessively long portion of the screw 23 projecting from the instrument.

The jaws 12 and 13 are of somewhat similar construction but differ in certain dimensions as set forth below. The jaws have shanks 27 with two parallel side walls or surfaces 28 (Figure 4). The two remaining opposite side walls 29 are slightly roof-shaped and have central parallel lands 30 with oppositely inclined or tapering portions 31 on either side thereof so as to provide a slight clearance and to give a limited amount of self-aligning motion when the jaw is inserted between the bars 15 and 16. The taper is very slight and is of the order of .001 inch, it being exaggerated in the drawings in order to show it clearly.

The jaws 12 and 13 are provided with heads 32 on the ends of the shanks 27, these heads 32 on one side having a partially concave cylindrical surface 33 and on the other side having a groove or slot 34 with a partially cylindrical bottom wall. The surfaces 33 and 35 on the heads 32 of the two jaws 12 and 13 are of similar shape but different radii of curvature in order to fit different diameters of internal bore gauges. Each concave surface 33 or 35 at its central point is exactly in line with and merges into the adjacent surface 28 of the shank 27 so that a knife-edge straight edge laid lengthwise along the surface 28 (Figure 4) would also accurately fit the surface 33 at the location where the two surfaces 28 and 33 are on the same level.

The extension rod or stem 26 does not directly engage the shank 27 of the jaw 12, but a clamping block 36 is interposed therebetween so as to prevent injury to the shank 27. The clamping block 36 is provided with a side arm 37 which extends snugly but slidably into the slot 20, the opposite edges of which serve as guide surfaces for the arm 37. Relief grooves 38 are provided at the corners or edges of the slot 20 (Figure 3).

In the use of the invention, it will of course be known in advance the diameter on which it is desired to check the internal bore gauge G, the measuring head only of which is shown in dotted lines in Figures 1 and 2. Precision gauge blocks 14 are selected of such dimensions that when they are stacked they add up to the desired diameter to be checked. The blocks 14, two of which are shown for purposes of illustration, are inserted between the shanks 27 of the jaws 12 and 13 in the space between the parallel side bars 15 and 16 and rest against the surfaces 28 of the jaw shanks 27. The clamping block 36 is then forced into clamping engagement with the gauge blocks 14 by turning the clamping screw 23. The concave surfaces 33 and 35 at their midportions are now exactly in line with the outer sides of the precision gauge blocks 14.

The internal bore gauge G is then inserted in the device with its fixed pin F seated in the groove 34 against the concave surface 35 and its movable pin M engaging the center of the concave surface 33. The locating or centering pins L move inward or outward to center the movable pin M in the cylindrical surface 33. The reading of the dial indicator (not shown) with which the internal bore gauge G is equipped should be the same as the distance between the opposite sides of the precision gauge blocks 14, otherwise the gauge is giving an erroneous reading. The dial or needle of the dial indicator may then be adjusted to compensate for the error and to insure that the gauge G will read accurately when placed in an actual bore.

Hitherto it has been found difficult to check internal bore gauges accurately other than by actual ring gauges. Ring gauges, however, are inflexible and therefore must be available in several diameters. The checking of internal bore gauges between flat surfaces has been found inaccurate in practice, as the gauge gives a different result when applied to a bore. In other words, when the round-tipped pins of the bore gauge are adjusted between flat surfaces of flat gauge blocks and then applied to a cylindrical bore, the readings of the gauge do not agree accurately.

The gauge checking device of the present invention, however, provides as many different diameters as there are gauge block combinations. Several sets of jaws with different curvatures of increasing radii on the jaws and for increasing widths of blocks give the device a wide range of diameters capable of being checked. With four sets of jaws, for example, diameters from ½ an inch to 14 inches may be checked. The arcuate or cylindrical surface on the one jaw holds the free pins L and M centered on one side, whereas the single pin F is centered in the slot 34 on the other side.

What I claim is:

1. An internal bore gauge checking device for use with a precision gauge block holder having gauge blocks mounted in a guideway therein, said checking device comprising a pair of opposed jaws with shanks slidably engaging said guideway, said shanks having opposed portions adapted to engage one or more precision gauge blocks placed therebetween, said jaws also having opposed contact surfaces engageable with the contact pins of the internal bore gauge to be checked, and clamping mechanism engaging and urging said jaws into clamping engagement with said gauge blocks, said shanks having slightly roof-shaped side surfaces inclined in opposite directions from the central portions thereof for self-alignment thereof in said guideway.

2. An internal bore gauge checking device for use with a precision gauge block holder having gauge blocks mounted in a guideway therein, said checking device comprising a pair of opposed jaws with shanks slidably engaging said guideway, said shanks having opposed portions adapted to engage one or more precision gauge blocks placed therebetween, said jaws also having opposed contact surfaces engageable with the contact pins of the internal bore gauge to be checked, and clamping mechanism engaging and urging said jaws into clamping engagement with said gauge blocks, said shanks having slightly roof-shaped side surfaces inclined in opposite directions from the central portions thereof with substantially parallel lands between said oppositely-inclined surfaces for self-alignment thereof in said guideway.

ANDREW EISELE.

REFERENCES CITED

The following references are of record in the file of this patent:

UNITED STATES PATENTS

| Number | Name | Date |
|---|---|---|
| 1,145,852 | Schramm | July 6, 1915 |
| 1,397,189 | Westerberg | Nov. 15, 1921 |
| 2,216,795 | Aller | Oct. 8, 1940 |
| 2,261,777 | Poppe | Nov. 4, 1941 |
| 2,409,817 | Webber | Oct. 22, 1946 |
| 2,427,924 | Rose | Sept. 23, 1947 |
| 2,466,322 | Merritt | Apr. 5, 1949 |

OTHER REFERENCES

Publication, "Gages," Standard Gage Co., Inc., Catalog No. 3, Copyright, 1927.

Publication, "Johansson Gage Blocks and Accessories," Catalog No. 17, page 23.